United States Patent
Becker et al.

(10) Patent No.: US 12,368,183 B2
(45) Date of Patent: Jul. 22, 2025

(54) RHEOLOGICALLY MODIFIED SLURRIES FOR ELECTROCHEMICAL CELLS AND COMPONENTS MADE THEREFROM

(71) Applicant: Solid Power Operating, Inc., Louisville, CO (US)

(72) Inventors: Collin Becker, Boulder, CO (US); Rose E. Ruther, Lafayette, CO (US); Jason E. Roberts, Denver, CO (US); Ian A Morrissey, Boulder, CO (US)

(73) Assignee: Solid Power Operating, Inc., Louisville, CO (US)

( * ) Notice: Subject to any disclaimer, the term of this patent is extended or adjusted under 35 U.S.C. 154(b) by 692 days.

(21) Appl. No.: 17/670,213

(22) Filed: Feb. 11, 2022

(65) Prior Publication Data

US 2022/0255128 A1    Aug. 11, 2022

Related U.S. Application Data (60) Provisional application No. 63/148,444, filed on Feb. 11, 2021.

(51) Int. Cl.
| | |
|---|---|
| *H01M 10/0562* | (2010.01) |
| *H01M 4/04* | (2006.01) |
| *H01M 4/38* | (2006.01) |
| *H01M 4/583* | (2010.01) |
| *H01M 4/62* | (2006.01) |

(52) U.S. Cl.
CPC ..... *H01M 10/0562* (2013.01); *H01M 4/0404* (2013.01); *H01M 4/0407* (2013.01); *H01M 4/382* (2013.01); *H01M 4/386* (2013.01); *H01M 4/583* (2013.01); *H01M 4/623* (2013.01); *H01M 4/625* (2013.01); *H01M 2300/0065* (2013.01)

(58) Field of Classification Search
CPC ..... H01M 10/0562; H01M 2300/0065; H01M 2300/0068; H01M 2300/0071; H01M 2300/0074; H01M 2300/0077; H01M 2300/008; H01M 2300/0082; H01M 4/622; H01M 4/623
See application file for complete search history.

(56) References Cited

U.S. PATENT DOCUMENTS

| | | | |
|---|---|---|---|
| 2015/0147660 A1 | 5/2015 | Fujiki et al. | |
| 2018/0034061 A1 | 2/2018 | Teran et al. | |
| 2020/0014033 A1* | 1/2020 | Yakovleva | H01M 10/0525 |
| 2021/0242490 A1* | 8/2021 | Ku | H01M 4/623 |
| 2022/0077493 A1 | 3/2022 | Oshima et al. | |

FOREIGN PATENT DOCUMENTS

| | | |
|---|---|---|
| CN | 109786845 A | 5/2019 |
| CN | 111883855 A | 11/2020 |
| WO | 2020261758 A1 | 12/2020 |

OTHER PUBLICATIONS

International Searching Authority, International Search Report and Written Opinion, issued in connection with International Application No. PCT/US2022/016191, mailed Jun. 8, 2022 ( pages).

* cited by examiner

*Primary Examiner* — Christopher P Domone
(74) *Attorney, Agent, or Firm* — Polsinelli PC; Gregory P. Durbin (57) ABSTRACT

A method for producing a rheologically modified slurry and electrochemical cells made therefrom.

10 Claims, 5 Drawing Sheets

RHEOLOGICALLY MODIFIED SLURRIES FOR ELECTROCHEMICAL CELLS AND COMPONENTS MADE THEREFROM

CROSS-REFERENCE TO RELATED APPLICATION

This application is related to and claims priority under 35 U.S.C. § 119(e) from U.S. Patent Application No. 63/148,444 filed Feb. 11, 2021 entitled "Rheologically Modified Slurries for Electrochemical Cells and Components Made Therefrom," the entire contents of which is incorporated herein by reference for all purposes.

TECHNICAL FIELD

Various embodiments described herein relate to the field of primary and secondary electrochemical cells, electrodes and electrode materials, electrolyte and electrolyte compositions and corresponding methods of making and using same.

BACKGROUND

The ever-increasing number and diversity of mobile devices, the evolution of hybrid/electric automobiles, and the development of Internet-of-Things (IOT) devices is driving greater need for battery technologies with improved reliability, capacity (e.g., amp hour (Ah) capacity), thermal characteristics, lifetime and recharge performance. Currently, lithium solid-state battery technologies offer potential improvements in these areas and further in safety, packaging efficiency, while also enabling new high-energy chemistries.

In order to meet this increased demand, new and more efficient ways of manufacturing electrochemical cells are needed.

SUMMARY

Provided herein are electrochemical cell layers comprising one or more solid state electrolytes and a rheology modifying component selected from the group consisting of a poly(styrene-butadiene-styrene) block copolymer (SBS), a poly (styrene-isoprene-styrene) block copolymer (SIS), and a poly (styrene-ethylene-butylene-styrene) block copolymer (SEBS), wherein the rheology modifying component is present in an amount of less than 5% by weight of the composition of the electrochemical cell layer. In an exemplary embodiment, the rheology modifying agent is present in an amount of less than 2% by weight of the electrochemical cell layer.

In some embodiments, the electrochemical cell layer is a separator layer comprising at least one additional binder or polymer. In some aspects, the binder or polymer is at least one polymer or binder selected from the group consisting of polystyrene, polyvinylidene fluoride (PVdF), and poly (vinylene difluoride-hexafluoropropylene) copolymer (PVdF-HFP).

In some embodiments, the electrochemical cell layer is a cathode layer further comprising a cathode active material, a binder or polymer, and a conductive additive. In some aspects, the cathode active material is selected from the group consisting of NMC, $LiFePO_4$, $LiCoO_2$, NCA, NMA, LMO, and iron sulfide. In some additional aspects, the conductive additive is selected form the group consisting of carbon black, graphite, graphene, VGCF, activated carbon, and carbon nanotubes.

In some embodiments, the electrochemical cell layer is an anode layer comprising an anode active material, a binder or polymer, and a conductive additive. In some aspects, the anode active material is selected from the group consisting of Si, Si alloys, graphite, Sn, Li, and lithium alloys. In some additional aspects, the conductive additive is selected from the group consisting of carbon black, graphite, graphene, VGCF, activated carbon, and carbon nanotubes.

Further provided herein is a method for producing an electrochemical cell. The method comprises forming a slurry of a solid-state electrolyte, a rheology modifying component selected from the group consisting of a poly (styrene-butadiene-styrene) block copolymer (SBS), a poly (styrene-isoprene-styrene) block copolymer (SIS), and a poly (styrene-ethylene-butylene-styrene) block copolymer (SEBS), and a solvent; and coating the slurry onto a substrate to form the electrochemical cell layer. In some embodiments, the rheology modifying component is present in an amount of less than 2% by weight of the solid composition of the slurry. In some additional embodiments, the method further comprises milling the slurry prior to coating the slurry onto the substrate and wherein the rheology modifying component is added to the other components of the slurry prior to milling. In further embodiments, the solid-state electrolyte is a sulfide solid-state electrolyte comprising a Lithium compound, a phosphorus compound, and a halogen. In still further embodiments, the solvent is selected from the group consisting of benzene, toluene, xylenes, heptane, and isobutyl isobutyrate.

In some embodiments, the electrochemical cell layer is a cathode layer and the slurry further comprises a cathode active material, a binder or polymer, and a conductive additive. In some aspects, the cathode active material is selected from the group consisting of NMC, $LiFePO_4$, $LiCoO_2$, NCA, NMA, LMO, and iron sulfide. In some additional aspects, the conductive additive is selected from the group consisting of carbon black, graphite, graphene, VGCF, activated carbon, and carbon nanotubes.

In some embodiments, the electrochemical cell layer is an anode layer and the slurry further comprises an active material, a binder or polymer, and a conductive additive. In some aspects, the anode active material is selected from the group consisting of Si, Si alloys, graphite, Sn, Li, and lithium alloys. In some additional aspects, the conductive additive is selected from the group consisting of carbon black, graphite, graphene, VGCF, activated carbon, and carbon nanotubes.

Further provided herein is a composition comprising a solvent, a solid-state electrolyte, a binder or polymer, and one or more rheology modifying components selected from the group consisting of poly (styrene-butadiene-styrene) block copolymers (SBS; also referred to herein as styrene-butadiene-styrene rubber, "SBR"), poly (styrene-isoprene-styrene) block copolymers (SIS), and poly (styrene-ethylene-butylene-styrene) block copolymers (SEBS), wherein the composition has a viscosity of about 100 cP to about 5000 cP. In some embodiments, the composition further comprises one of a cathode active material or an anode active material, and a conductive additive. In some additional embodiments, the composition has a solids-to-solvent ratio of about 10% to about 90% by weight.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without adhering to some of the specific details set forth herein. Moreover, to avoid obscuring the invention, some well-known methods, processes, devices, and systems finding application in the various embodiments described herein are not disclosed in detail.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual values and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Furthermore, such an interpretation should apply regardless of the breadth of the range or the characteristics being described.

Although certain examples herein may be described in association with solid-state electrolytes, it should be understood that the materials, methods and procedures described herein may be applied to electrochemical cells using gels electrolytes, semi-solid electrolytes, or combinations of liquid and solid-state electrolytes.

Described herein is a process for making one or more layers of an electrochemical cell using a rheologically-modified slurry, and the electrochemical cells made therefrom. Generally, adding polymers to modify the rheology of the slurries is disfavored because large amounts of rheology modifying polymers must be added to significantly modify the rheology of the slurry. Generally, the addition of large amounts of rheology modifying components decreases the performance of the electrochemical cell, e.g., by increasing the resistance of the cell. Thus, the rheology modifying components must be removed from the slurry to maintain the performance of the cell, which increases processing time and expense. The inventors surprisingly found that the rheology of the slurries could be significantly modified by including a relatively small amount of the rheology modifying components described herein, thereby making the processing of the slurries more efficient without significantly compromising the performance of the electrochemical cell.

Figure 1:
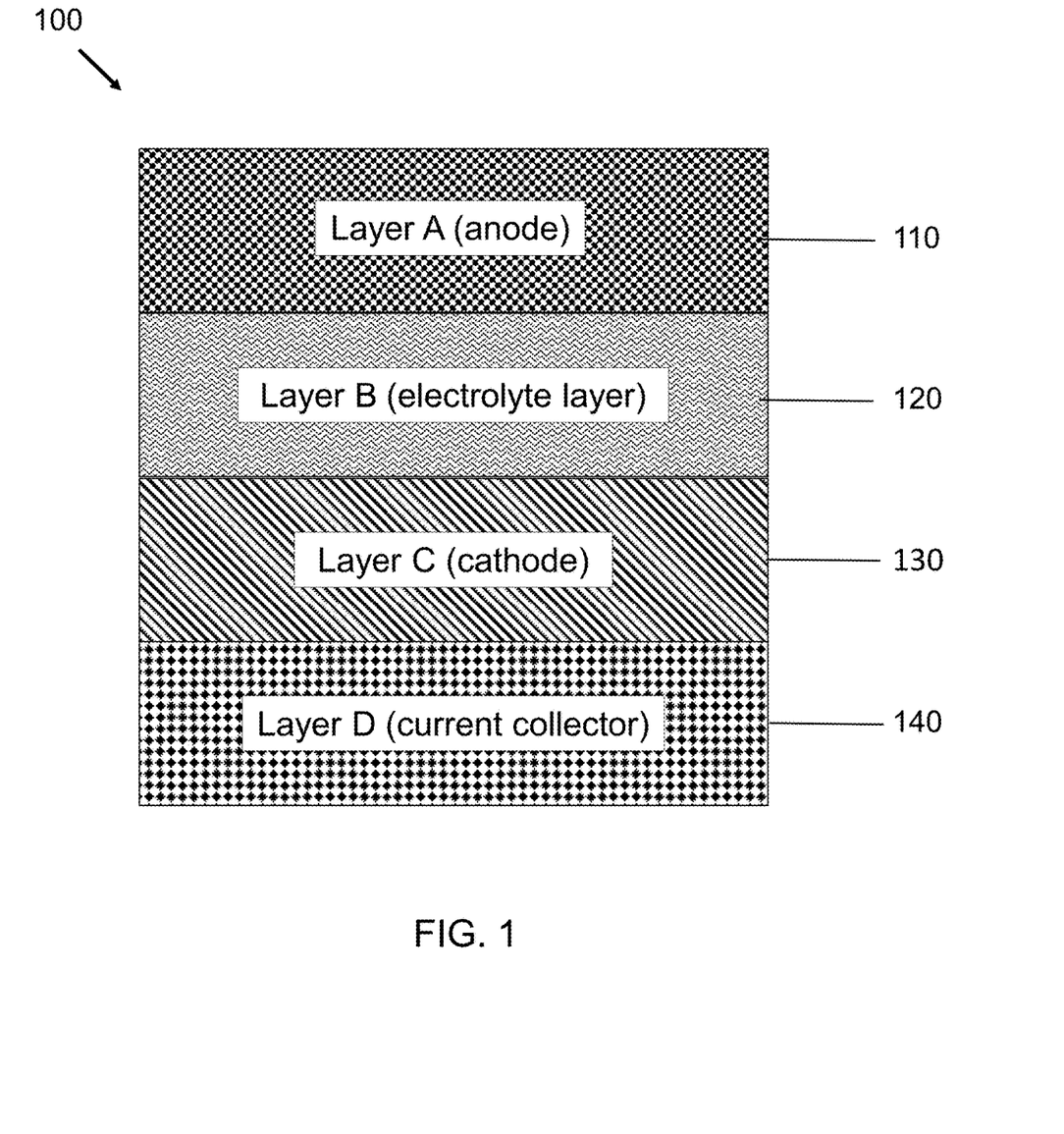
FIG. 1 is a simplified schematic diagram of the layer structure of an electrochemical cell, in accordance with an embodiment.

FIG. 1 is a simplified schematic diagram of the layer structure of an exemplary electrochemical cell 100 including a solid-state electrolyte. The electrochemical cell 100 may include multiple layers including, but not limited to, an anode layer 110, an electrolyte layer 120 (also referred to herein as a "separator layer"), a cathode layer 130, and a current collector layer 140.

The anode layer 110 may be formed from foils of lithium metal or lithium alloys where the lithium alloys may comprise one or more of Sodium metal (Na), or Potassium metal (K). In one embodiment, the lithium metal foil may comprise one or more of an alkaline earth metal such as Magnesium (Mg) and Calcium (Ca). In another embodiment, the lithium foil may comprise Aluminum (Al), Indium (In), Silver (Ag), Gold (Au), or Zinc (Zn).

In a further embodiment, lithium may be deposited on a metal foil which may act as a current collector much like the current collector layer 140. The metal foil may comprise one or more of Copper (Cu), Aluminum (Al), Nickel (Ni), Titanium (Ti), Stainless Steel, Magnesium (Mg), Iron (Fe), Zinc (Zn), Indium (In), Germanium (Ge), Silver (Ag), Platinum (Pt), or Gold (Au). In some aspects, the metal foil may have a thickness of about 6 μm to about 10 μm; for example, about 6 μm, 7 μm, 8 μm, 9 μm, or about 10 μm. In preferred embodiments, the metal foil comprises Stainless Steel or Copper.

In one embodiment, the anode layer 110 may comprise one or more materials such as Silicon (Si), Tin (Sn), Germanium (Ge) graphite, $Li_4Ti_5O_{12}$ (LTO) or other known anode active materials.

In some embodiments, the anode layer 110 may further comprise one or more conductive additives. The conductive additives may include metal powders, fibers, filaments, or any other material known to conduct electrons. In some aspects, the one or more conductive additives may include one or more conductive carbon materials such as carbon fiber, graphite, graphene, carbon black, conductive carbon, amorphous carbon, VGCF, and carbon nanotubes. In some embodiments, the conductive additive may be present in the anode layer in an amount of about 3% by weight.

In some aspects, the conductive additive may be present in the anode layer in an amount of about 0% to about 99%, or more preferably about 0% to about 20%, or even more preferably about 0% to about 10% by weight.

In some embodiments, the anode layer 110 may further comprise one or more solid-state electrolytes. The one or more solid-state electrolyte may comprise an oxide, oxysulfide, sulfide, halide, nitride, or any other solid-state electrolyte known in the art. In some preferred embodiments, the one or more solid-state electrolyte may comprise a sulfide solid-state electrolyte; i.e., a solid-state electrolyte having at least one sulfur component. In some embodiments, the one or more solid-state electrolytes may comprise one or more material combinations such as $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—S—$SiS_2$—LiCl, $Li_2S$—S—$SiS_2$—$B_2S_3$—LiI, $Li_2S$—S—$SiS_2$—$P_2S_5$—LiI, $Li_2S$—$B_2S_3$, $Li_2S$—$P_2S_5$—$Z_mS_n$ (where m and n are positive numbers, and Z is Ge, Zn or Ga), $Li_2S$—$GeS_2$, $Li_2S$—S—$SiS_2$—$Li_3PO_4$, and $Li_2S$—S—$SiS_2$—$Li_xMO_y$ (where x and y are positive numbers, and M is P, Si, Ge, B, Al, Ga or In).

In another embodiment, the solid-state electrolyte may be one or more of a $Li_3PS_4$, $Li_4P_2S_6$, $Li_7P_3S_{11}$, $Li_{10}GeP_2S_{12}$, $Li_{10}SnP_2S_{12}$. In a further embodiment, the solid-state electrolyte may be one or more of a $Li_6PS_5Cl$, $Li_6PS_5Br$, $Li_6PS_5I$ or expressed by the formula $Li_{7-y}PS_{6-y}X_y$, where "X" represents at least one halogen and/or at least one pseudo-halogen, and where $0<y\leq 2.0$ and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN. In yet another embodiment, the solid-state electrolyte be expressed by the formula $Li_{8-y-z}P_2S_{9-y-z}X_yW_z$ (where "X" and "W" represents at least one halogen and/or at least one pseudo-halogen and where $0\leq y\leq 1$ and $0\leq z\leq 1$) and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN.

In some aspects, the solid state electrolyte may be present in the anode layer 110 in an amount of about 0% to about 50%, or more preferably about 0% to about 40% by weight.

The anode layer 110 may further comprise one or more of a binder or polymer. In some embodiments, the binder or polymer may comprise fluororesin containing vinylidene fluoride (VdF), hexafluoropropylene (HFP), tetrafluoroethylene (TFE), and derivatives thereof as structural units. In some additional embodiments, the binder or polymer may comprise homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, poly (methacrylate) nitrile-butadiene rubber (PMMA-NBR) and the like. In a further embodiment, the polymer or binder may be one or more of an acrylic resin such as but not limited to polymethyl(meth)acrylate, polyethyl(meth)acrylate, polyisopropyl(meth)acrylate polyisobutyl(meth)acrylate, polybutyl(meth)acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber such as but not limited to acrylonitrile-butadiene rubber (ABR), polystyrene nitrile-butadiene rubber (PS-NBR), and mixtures thereof. In some embodiments, the binder or polymer may comprise one or more rheology modifying components. In some preferred embodiments, when the binder or polymer comprises one or more rheology modifying components, the binder or polymer further comprises one or more additional binders or polymers that are not rheology modifying components.

In some aspects, the binder or polymer may be present in the anode layer 110 in an amount of about 0% to about 20% by weight. In some additional aspects, the binder or polymer may be present in the anode layer 110 in an amount of about 0% to about 5%, about 5% to about 10%, about 10% to about 15%, about 15% to about 20%, about 0% to about 10%, about 0% to about 15%, or about 5% to about 15% by weight.

In some embodiments, the anode layer 110 may have a thickness of about 20 μm to about 40 μm. For example, the anode layer may have a thickness of about 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, or about 40 μm. In an exemplary embodiment, the anode layer comprises lithium metal with a thickness of 34 μm.

The electrolyte layer 120 (also referred to herein as the "separator layer") may include one or more solid-state electrolytes. The one or more solid-state electrolyte may comprise an oxide, oxysulfide, sulfide, halide, nitride, or any other solid-state electrolyte known in the art. In some preferred embodiments, the one or more solid-state electrolytes may comprise a sulfide solid-state electrolyte. In some aspects, the one or more sulfide solid-state electrolyte may comprise one or more material combinations such as $Li_2S$—$P_{2S5}$, $Li_2S$—$P_{2S5}$—LiI, $Li_2S$—$P_{2S5}$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—S—$SiS_2$—LiCl, $Li_2S$—S—$SiS_2$—$B_2S_3$—LiI, $Li_2S$—S—$SiS_2$—$P_2S_5$—LiI, $Li_2S$—$B_2S_3$, $Li_2S$—$P_2S_5$—$Z_mS_n$ (where m and n are positive numbers, and Z is Ge, Zn or Ga), $Li_2S$—$GeS_2$, $Li_2S$—S—$SiS_2$—$Li_3PO_4$, and $Li_2S$—S—$SiS_2$—$Li_xMO_y$ (where x and y are positive numbers, and M is P, Si, Ge, B, Al, Ga or In). In some embodiments, one or more of the solid electrolyte materials may be $Li_3PS_4$, $Li_4P_2S_6$, $Li_7P_3S_{11}$, $Li_{10}GeP_2S_{12}$, $Li_{10}SnP_2S_{12}$. In another embodiment, one or more of the solid electrolyte materials may be $Li_6PS_5Cl$, $Li_6PS_5Br$, $Li_6PS_5I$ or expressed by the formula $Li_{7-y}PS_{6-y}X_y$, where "X" represents at least one halogen and/or at least one pseudo-halogen, where $0<y\leq 2.0$, and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN. In another embodiment, one or more of the solid electrolyte materials may be expressed by the formula $Li_{8-y-z}P_2S_{9-y-z}X_yW_z$ (where "X" and "W" represents at least one halogen and/or at least one pseudo-halogen and where $0\leq y\leq 1$ and $0\leq z\leq 1$) and where the halogen may be one or more of F, Cl, Br, I, and the pseudo-halogen may be one or more of N, NH, $NH_2$, NO, $NO_2$, $BF_4$, $BH_4$, $AlH_4$, CN, and SCN.

The electrolyte layer 120 may further comprise one or more of a binder or polymer. In some embodiments, the binder or polymer may include fluororesin containing vinylidene fluoride (VdF), hexafluoropropylene (HFP), tetrafluoroethylene (TFE), and derivatives thereof as structural units. Specific examples thereof may include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer, such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, poly (methacrylate) nitrile-butadiene rubber (PMMA-NBR) and the like. In a further embodiment, the polymer or binder may be one or more of an acrylic resin such as but not limited to polymethyl(meth)acrylate, polyethyl(meth)acrylate, polyisopropyl(meth)acrylate polyisobutyl(meth)acrylate, polybutyl(meth)acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber such as but not limited to acrylonitrile-butadiene rubber (ABR), polystyrene nitrile-butadiene rubber (PS-NBR), and mixtures thereof. In some embodiments, the binder or polymer may comprise one or more rheology modifying components. In some preferred embodiments, when the binder or polymer comprises one or more rheology modifying components, the binder or polymer further comprises one or more additional binders or polymers that are not rheology modifying components.

In some aspects, the binder or polymer may be present in the anode layer 110 in an amount of about 0% to about 20% by weight. In some additional aspects, the binder or polymer may be present in the anode layer 110 in an amount of about 0% to about 5%, about 5% to about 10%, about 10% to about 15%, about 15% to about 20%, about 0% to about 10%, about 0% to about 15%, or about 5% to about 15% by weight.

In some embodiments, the electrolyte layer 120 may have a thickness of about 20-40 µm. For example, the electrolyte layer 120 may have a thickness of about 20 µm, 21 µm, 22 µm, 23 µm, 24 µm, 25 µm, 26 µm, 27 µm, 28 µm, 29 µm, 30 µm, 31 µm, 32 µm, 33 µm, 34 µm, 35 µm, 36 µm, 37 µm, 38 µm, 39 µm, or about 40 µm.

The cathode layer 130 may include a cathode active material such as ("NMC") nickel-manganese-cobalt which can be expressed as $Li(Ni_aCo_bMn_c)O_2$ ($0<a<1$, $0<b<1$, $0<c<1$, $a+b+c=1$) or, for example, NMC 111 ($LiNi_{0.33}Mn_{0.33}Co_{0.33}O_2$), NMC 433 ($LiNi_{0.4}Mn_{0.3}Co_{0.3}O_2$), NMC 532 ($LiNi_{0.5}Mn_{0.3}Co_{0.2}O_2$), NMC 622 ($LiNi_{0.6}Mn_{0.2}Co_{0.2}O_2$), NMC 811 ($LiNi_{0.8}Mn_{0.1}Co_{0.1}O_2$) or a combination thereof. In another embodiment, the cathode active material may comprise one or more of a coated or uncoated metal oxide, such as but not limited to $V_2O_5$, $V_6O_{13}$, $MoO_3$, $LiCoO_2$, $LiNiO_2$, $LiMnO_2$, $LiMn_2O_4$, $LiN_{1-y}Co_yO_2$, $LiCo_{1-y}Mn_yO_2$, $LiN_{1-y}Mn_yO_2$ ($0 \leq Y<1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, $CuO$, $Li(Ni_aCo_bAl_c)O_2$ ($0<a<1$, $0<b<1$, $0<c<1$, $a+b+c=1$) or a combination thereof. In yet another embodiment, the cathode active material may comprise one or more of a coated or uncoated metal sulfide such as but not limited to titanium sulfide ($TiS_2$), molybdenum sulfide ($MoS_2$), iron sulfide ($FeS$, $FeS_2$), copper sulfide ($CuS$), and nickel sulfide ($Ni_3S_2$) or combination thereof.

The cathode layer 130 may further comprise one or more conductive additives. The conductive additives may include metal powders, fibers, filaments, or any other material known to conduct electrons. In some aspects, the one or more conductive additives may include one or more conductive carbon materials such as carbon fiber, graphite, graphene, carbon black, conductive carbon, amorphous carbon, VGCF, and carbon nanotubes. In some embodiments, the conductive additive may be present in the cathode layer in an amount of about 3% by weight.

In some aspects, the conductive additive may be present in the cathode layer 130 in an amount of about 1% to about 10%, or more preferably about 1% to about 8%, or even more preferably about 1% to about 5% by weight.

The cathode layer 130 may further comprise one or more solid-state electrolytes. The one or more solid-state electrolyte may comprise an oxide, oxysulfide, sulfide, halide, nitride, or any other solid-state electrolyte known in the art. In some preferred embodiments, the one or more solid-state electrolytes may comprise a sulfide solid-state electrolyte. In some embodiments, the solid-state electrolyte comprises one or more material combinations such as $Li_2S$—$P_2S_5$, $Li_2S$—$P_2S_5$—$LiI$, $Li_2S$—$P_2S_5$—$GeS_2$, $Li_2S$—$P_2S_5$—$Li_2O$, $Li_2S$—$P_2S_5$—$Li_2O$—$LiI$, $Li_2S$—$P_2S_5$—$LiI$—$LiBr$, $Li_2S$—$SiS_2$, $Li_2S$—$SiS_2$—$LiI$, $Li_2S$—$SiS_2$—$LiBr$, $Li_2S$—$S$—$SiS_2$—$LiCl$, $Li_2S$—$S$—$SiS_2$—$B_2S_3$—$LiI$, $Li_2S$—$S$—$SiS_2$—$P_2S_5$—$LiI$, $Li_2S$—$B_2S_3$, $Li_2S$—$P_2S_5$—$Z_mS_n$ (where m and n are positive numbers, and Z is Ge, Zn or Ga), $Li_2S$—$GeS_2$, $Li_2S$—$S$—$SiS_2$—$Li_3PO_4$, and $Li_2S$—$S$—$SiS_2$—$Li_xMO_y$, (where x and y are positive numbers, and M is P, Si, Ge, B, Al, Ga or In). In another embodiment, the solid-state electrolyte may be one or more of a $Li_3PS_4$, $Li_4P_2S_6$, $Li_7P_3S_{11}$, $Li_{10}GeP_2S_{12}$, $Li_{10}SnP_2S_{12}$. In a further embodiment, the solid-state electrolyte may be one or more of a $Li_6PS_5Cl$, $Li_6PS_5Br$, $Li_6PS_5I$ or expressed by the formula $Li_{7-y}PS_{6-y}X_y$, where "X" represents at least one halogen and/or at least one pseudo-halogen, where $0<y \leq 2.0$, and where the at least one halogen may be one or more of F, Cl, Br, I, and the at least one pseudo-halogen may be one or more of N, NH, $NH_2$, NO, $NO_2$, $BF_4$, $BH_4$, $AlH_4$, CN, and SCN. In yet another embodiment, the solid-state electrolyte be expressed by the formula $Li_{6-y-z}P_2S_{9-y-z}X_yW_z$ (where "X" and "W" represents at least one halogen elements and or pseudo-halogen and where $0 \leq y \leq 1$ and $0 \leq z \leq 1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN.

In some aspects, the solid state electrolyte may be present in the cathode layer 130 in an amount of about 5% to about 20%, or more preferably about 10% to about 18% by weight.

The cathode layer 130 may further comprise one or more of a binder or polymer. In some embodiments, the binder or polymer may include fluororesin containing vinylidene fluoride (VdF), hexafluoropropylene (HFP), tetrafluoroethylene (TFE), and derivatives thereof as structural units. Specific examples thereof include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the polymer or binder may be one or more of an acrylic resin such as but not limited to polymethyl (meth) acrylate, polyethyl (meth) acrylate, polyisopropyl (meth) acrylate polyisobutyl (meth) acrylate, polybutyl (meth) acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber such as but not limited to acrylonitrile-butadiene rubber (ABR), polystyrene nitrile-butadiene rubber (PS-NBR), and mixtures thereof. In some embodiments, the binder or polymer may comprise one or more rheology modifying components. In some preferred embodiments, when the binder or polymer comprises one or more rheology modifying components, the binder or polymer further comprises one or more additional binders or polymers that are not rheology modifying components.

In some aspects, the binder or polymer may be present in the cathode layer 130 in an amount of about 0% to about 5%. In some additional aspects, the binder or polymer may be present in the cathode layer 130 in an amount of about 0% to about 2.5%, about 2.5% to about 5%, about 0% to about 1%, about 0% to about 2%, about 0% to about 3%, about 0% to about 4%. In an exemplary embodiment, the binder or polymer may be present in the cathode layer 130 in an amount of about 0.25% to about 2%.

The current collector layer 140 may comprise one or more of Aluminum (Al), Nickel (Ni), Titanium (Ti), Stainless Steel, Magnesium (Mg), Iron (Fe), Zinc (Zn), Indium (In), Germanium (Ge), Silver (Ag), Platinum (Pt), Gold (Au). In some embodiments, a second current collector layer may be disposed adjacent to the anode layer. In a preferred embodiment, the current collector layer 140 comprises Aluminum.

In some embodiments, the current collector layer 140 may have a thickness of about 10 μm to about 20 μm. For example, the current collector layer 140 may have a thickness of about 10 μm, 11 μm, 12 μm, 13 μm, 14 μm, 15 μm, 16 μm, 17 μm, 18 μm, 19 μm, or about 20 μm. In an exemplary embodiment, the current collector layer 140 comprises aluminum having a thickness of about 12-14 μm.

Figure 2:
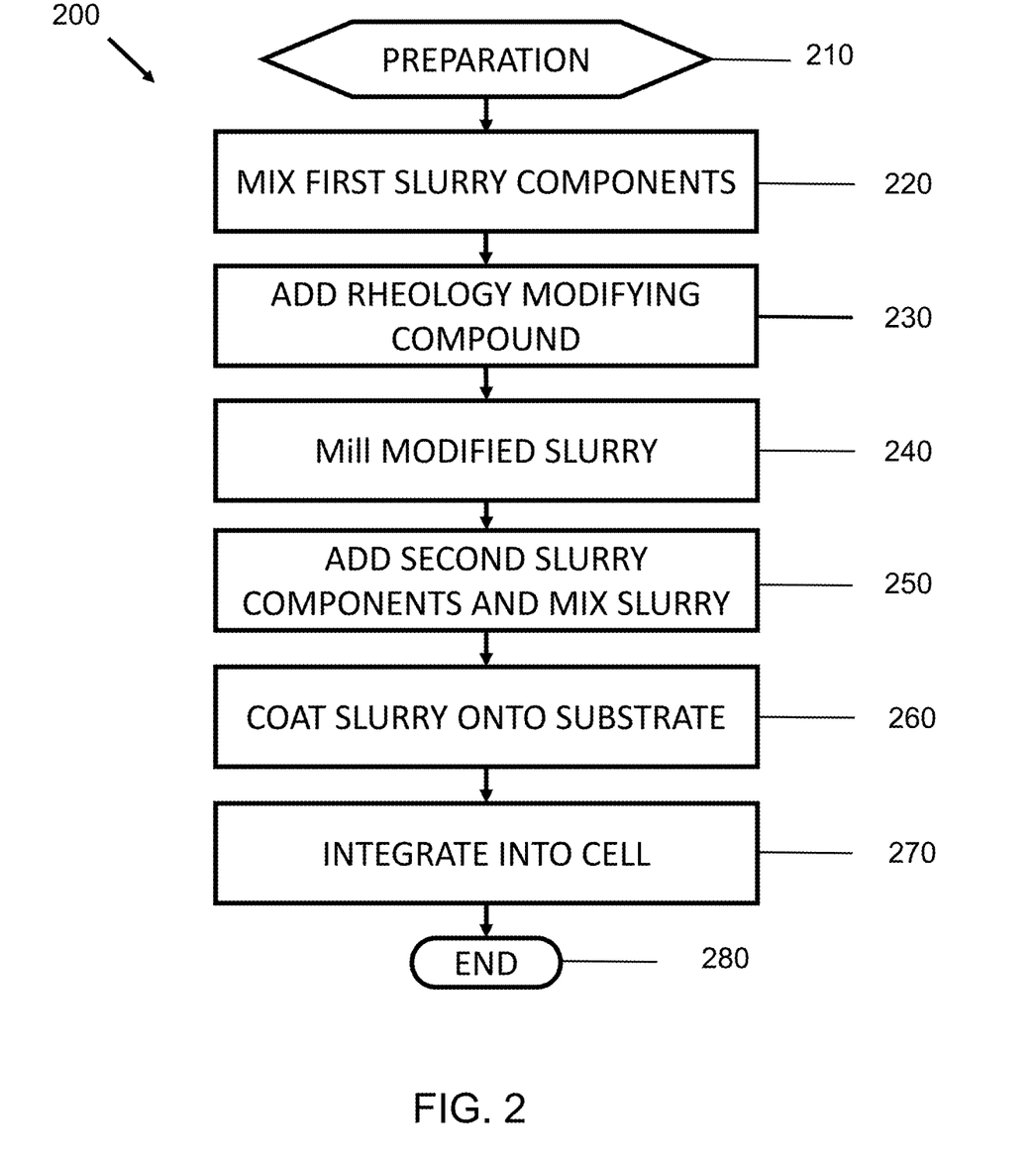
FIG. 2 is a flow chart of a process for preparation of a layer of an electrochemical cell, in accordance with an embodiment.

FIG. 2 is a flow chart of a process for preparation of a layer of an electrochemical cell and will be described in association with cathode layer 130 of FIG. 1. It should be noted that the process, with appropriate alterations, may also be used for the preparation of an anode layer. For example, prior to forming the anode layer, a silicon material used for the anode preparation may be processed to reduce its particle size. This particle size reduction step may be performed at any stage that is before the casting/coating step. This includes but is not limited to milling/grinding only the silicon material, the silicon material with the conductive additives, the silicon material with the solid electrolyte material, the silicon material with a binder, or any combination thereof. Therefore, where terms such as catholyte, catholyte slurry, and cathode layer are described they are not limiting and respective terms anolyte, anolyte slurry, and anode layer may be substituted.

In one embodiment, the process 200 begins with a preparation step 210 wherein any preparation actions such as pre-dissolving of binders in solution and selection and portioning of the components and equipment preparation may take place. In one aspect, the solvent may be selected from but is not limited to one of the following: aprotic hydrocarbons, esters, ethers or nitriles. In another aspect, the aprotic hydrocarbons may be selected from but are not limited to one of the following: xylenes, toluene, benzene, methyl benzene, hexanes, heptane, octane, alkanes, isoparaffinic hydrocarbons or a combination thereof. In another aspect, the esters may be selected from but are not limited to one of the following: butyl butyrate, isobutyl isobutyrate methyl propionate, ethyl propionate, propyl propionate, butyl propionate, methyl acetate, ethyl acetate, propyl acetate, butyl acetate or a combination thereof. In another aspect, the ethers may be selected from but are not limited to one of the following: diethyl ether, dibutyl ether, benzyl ether or a combination thereof. In another aspect, the nitriles may be selected from but are not limited to one of the following: acetonitrile, propionitrile, butyronitrile, pyrrolidine or a combination thereof.

After any initial preparation, process 200 advances to step 220 where first components and the solvent are mixed to form a slurry. As used herein, a slurry refers to a semiliquid mixture of solid particles suspended in a solvent. First components of a catholyte slurry may include a solvent, a solid-state electrolyte, and a binder or polymer. Mixing action may be provided by known means.

Mixing may be performed prior to the addition of, during step 230, one or more rheology modifying components to the mixed slurry. Mixing prior to the addition is performed to initially wet the catholyte slurry. Rheology modifying components may be selected from but are not limited to the following compounds, such as a poly (styrene-butadiene-styrene) block copolymers (SBS; also referred to herein as styrene-butadiene-styrene rubber, "SBR"), poly (styrene-isoprene-styrene) block copolymers (SIS), or poly (styrene-ethylene-butylene-styrene) block copolymers (SEBS).

The rheology modifying components may be added to the slurry at less than 5% by weight of the slurry. Thus, the rheology modifying component may be present in the resulting electrochemical cell layer in an amount of less than 5% by weight. In some aspects, the rheology modifying may be present in the electrochemical cell layer in an amount of less than 5%, less than 4%, less than 3%, less than 2%, less than 1%, or less than 0.5% by weight. In some additional aspects, the rheology modifying component may be present in the electrochemical cell layer in an amount of about 0% by weight to about 5% by weight, about 0% by weight to about 4% by weight, about 0% by weight to about 3% by weight, or about 0% to about 2% by weight. In an exemplary embodiment, the electrochemical cell layer is a cathode layer and the rheology modifying component is present in an amount of about 0.25% by weight. In another exemplary embodiment, the electrochemical cell layer is an anode layer and the rheology modifying component is present in an amount of about 2% by weight.

In some embodiments, the rheology modifying components may be added at less than 5% by weight for a solid electrolyte slurry. In some aspects, the rheology modifying components may be added at less than 5%, less than 4%, less than 3%, less than 2%, less than 1%, or less than 0.5% by weight for a solid electrolyte slurry. In some additional aspects, the rheology modifying components may be added at about 0% by weight to about 5% by weight, or more preferably about 0.2% by weight to about 2% by weight for a solid electrolyte slurry. In an exemplary embodiment, the rheology modifying components may be added at about 1% by weight for a solid electrolyte slurry.

In some embodiments, the rheology modifying components may be added at less than 5% by weight for a cathode slurry. In some aspects, the rheology modifying components may be added at less than 5%, less than 4%, less than 3%, less than 2%, less than 1%, or less than 0.5% by weight for a cathode slurry. In some additional aspects, the rheology modifying components may be added at about 0% by weight to about 5% by weight, or more preferably about 0.2% by weight to about 2% by weight for a cathode slurry. In an exemplary embodiment, the rheology modifying components may be added at about 0.25% by weight for a cathode slurry.

In some embodiments, the rheology modifying components may be added at less than 5% by weight for an anode slurry. In some aspects, the rheology modifying components may be added at less than 5%, less than 4%, less than 3%, less than 2%, less than 1%, or less than 0.5% by weight for an anode slurry. In some additional aspects, the rheology modifying components may be added at about 0% by weight to about 5% by weight, or more preferably about 0.5% by weight to about 4% by weight, or even more preferably about 1% by weight to about 3% by weight. In an exemplary embodiment, the rheology modifying components may be added at about 2% by weight for an anode slurry.

Figure 4A:
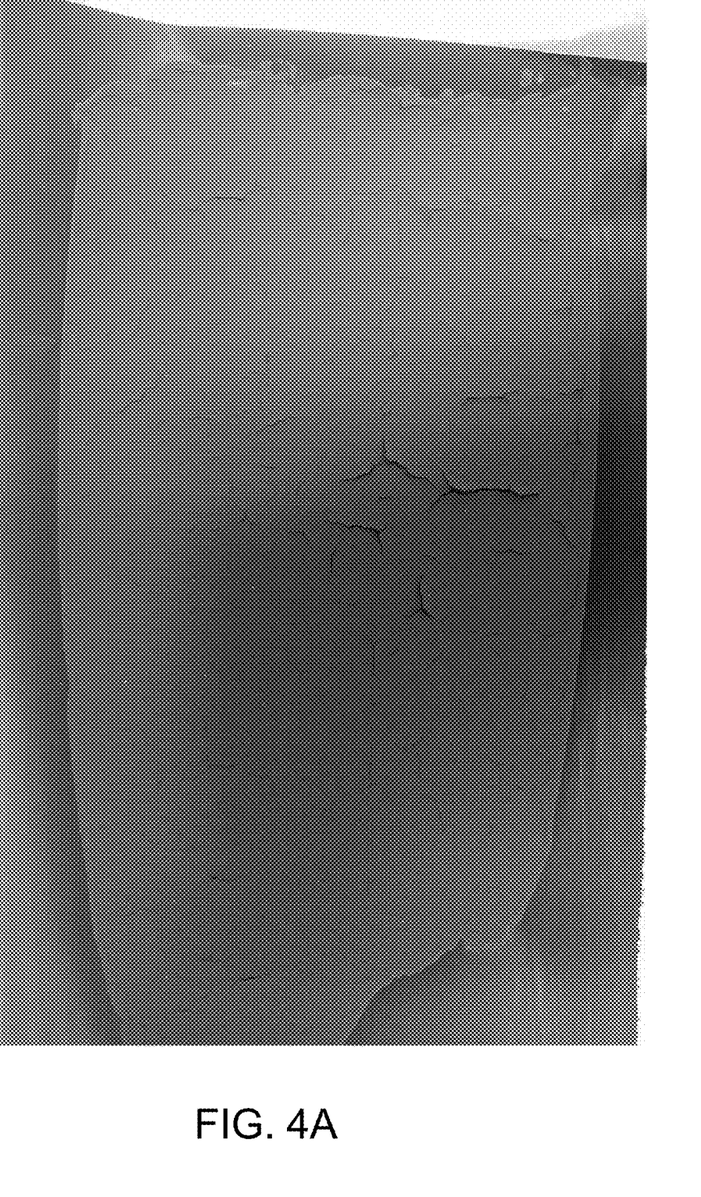
FIGS. 4A and 4B show exemplary electrochemical cell layers that made without the use of a rheology modifying component (FIG. 4A) and with the use of a rheology modifying component (FIG. 4B).
Figure 4B:
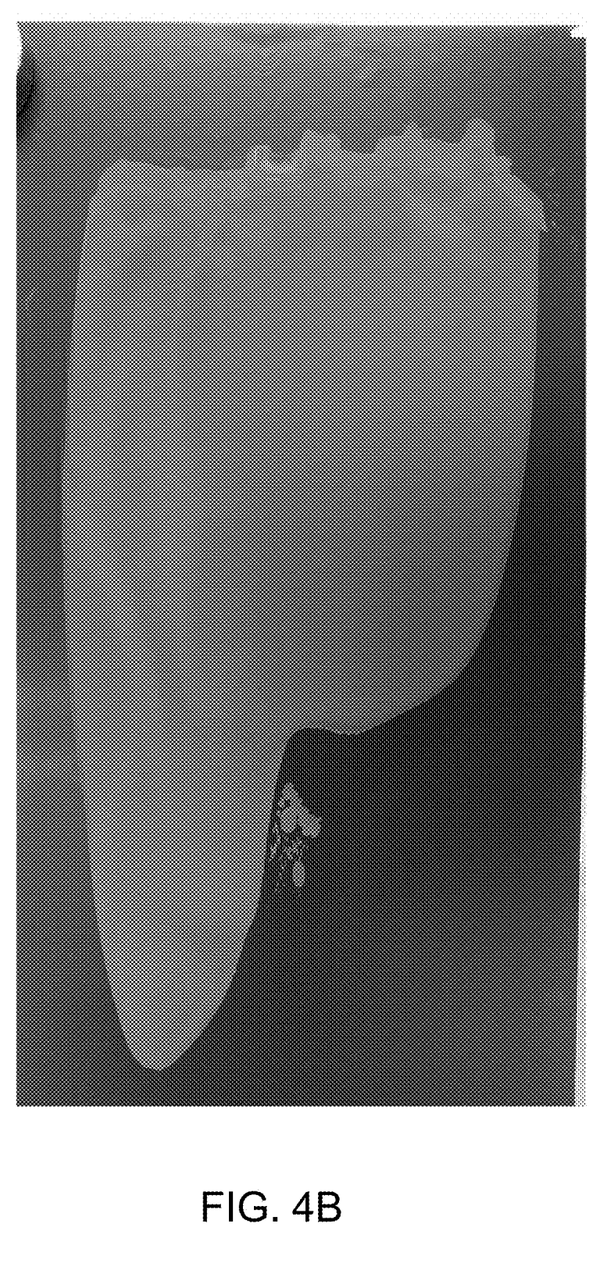

In some aspects, the rheology modifying components may be added at less than 5% by weight or other amounts as required to reduce the viscosity while supporting a high solid-to-solvent ratio. A high solid-to solvent ratio is favorable for drying the slurry because less solvent is required, meaning that there is less solvent to evaporate and recover. Moreover, when the slurry has a low solid-to-solvent ratio, the slurry may not dry evenly. For example, when drying the coated slurry using forced air drying, the top surface of the slurry dries first. As the solvent within the layer evaporates, it is pushed toward the surface and causes the newly dried surface to crack (often referred to as "mud cracking"), as shown in FIG. 4A. By lowering the amount of solvent in the slurry, the layers are able to dry in a more uniform way, thus preventing mud cracking as shown in FIG. 4B.

In another aspect, suitable viscosity values range from approximately 100 cP to 5000 cP, 500 cP to 3000 cP, or 1000 cP to 2000 cP. In some additional aspects, the slurry may have a viscosity of 100 cP to 4000 cP, 100 cP to 3000 cP, 100 cP to 2000 cP, 500 cP to 4000 cP, 500 cP to 3000 cP, 500 cP to 2000 cP, 1000 cP to 5000 cP, 1000 cP to 4000 cP, or 1000 cP to 3000 cP. Suitable solid-to-solvent ratios range from about 10% to about 90%, about 20% to about 80%, or about 30% to about 70% by weight for an exemplary slurry. In some additional aspects, the solid-to-solvent ratio may be about 10%, 20%, 30%, 40%, 50%, 60%, 70%, 80% or about 90%. In preferred embodiments, the slurry does not exhibit mud cracking when the slurry is dried. In other preferred embodiments, the slurry is substantially resistant to mud cracking when the slurry is dried, as depicted in FIG. 4B. In still other preferred embodiments, the dried slurry is substantially free of mud cracking and/or surface cracking.

In some additional aspects, the power law coefficient of the slurry may be less than 1; preferably, the power law coefficient of the slurry may be between about 0.25 to about 0.75. In some examples, the power law coefficient of the slurry may be about 0.9, 0.8, 0.7, 0.6, 0.5, 0.4, 0.3, 0.2, or about 0.1.

After the rheology has been modified, during step 240, the catholyte slurry may be milled to reduce the particle size of the electrolyte within the slurry to a preferred size. Milling may be achieved by conventional means. Adding the rheology modifying component prior to milling allows for improved milling conditions of the catholyte slurry, such as a more uniform mixing of the catholyte slurry and a reduction in the amount of processing steps as compared to milling all the components of the catholyte slurry first and mixing the components at a later step. Addition of the rheology modifying component may prevent particles in the slurry from agglomerating. Without the addition of the rheology modifying component the catholyte slurry, milling may be inhibited and electrolyte particle size reduction may be difficult.

In some embodiments, the particle size of the solids in the slurry may be less than about 1 µm. As used herein, the particle size refers to the median diameter ($D_{50}$) of the particles. Methods of measuring the median diameter of particles are well known in the art. In some examples, the particle size of the solids in the slurry may be about 0.9 µm, 0.8 µm, 0.7 µm, 0.6 µm, 0.5 µm, 0.4 µm, 0.3 µm, 0.2 µm, 0.1 µm, or less than 0.1 µm.

In another embodiment, subsequent to milling, during step 250, second components of the slurry may be added. Second slurry components may include an active cathode material, a conductive additive, and an additional binder.

Additional rheology modifying components may also be added to the catholyte slurry to modify the final rheology of the catholyte slurry to achieve suitable viscosity and power law coefficient for uniform coatings. Adding the rheology modifying component to control the final rheology for coating allows the catholyte slurry to quickly change from a preferred milling consistency to a casting/coating consistency. During step 260 the catholyte slurry may be coated onto a suitable carrier or substrate such as an aluminum, carbon-coated aluminum, copper or carbon coated copper current collector 140 of FIG. 1. Similar carriers, especially copper-based, may be used for the anode slurry. The slurry and carrier may be processed to cure and/or dry. The resultant layer structure may be integrated into an electrochemical cell during step 270. Process 200 may be complete with step 280.

The catholyte slurry as compounded by process 200 has improved rheology, which may be accompanied by a viscosity of about 100 cP to about 5000 cP and/or an increase in the power law coefficient. The rheology modifying component may be added at multiple stages of the preparation of the slurry to modify the rheology to meet the needs of intermediate process conditions. Various aspects of the present disclosure may involve some or all of the additions at various stages, alone or in combinations. As described above, the rheology modifying component may be added to the catholyte slurry to change the rheology to an improved state for milling and may also be subsequently added to modify the final rheology of catholyte slurry to create a coatable or castable slurry. The modified slurry provides a reduction in susceptibility to separation and thickness variation which both lead to poor cycling performance for cells constructed from less suitable materials.

Figure 3:
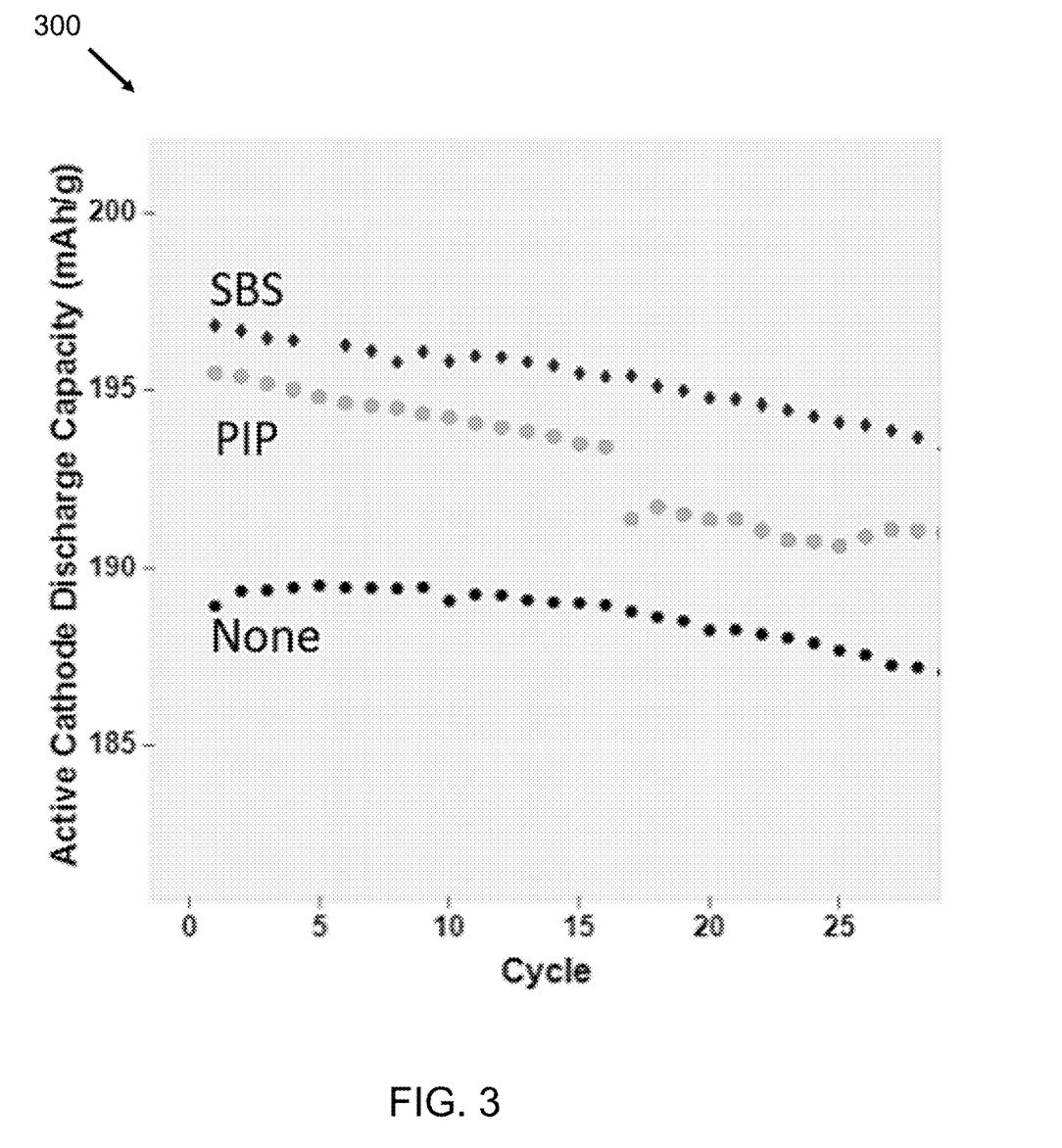
FIG. 3 is a plot of flow chart of performance data on capacity retention for an electrochemical cell constructed in accordance with an embodiment.

FIG. 3 is a plot of performance data on capacity retention for an electrochemical cell constructed according to aspects of the present disclosure. As shown in plot 300, the addition of SBS and SIS polymers provides a capacity retention benefit over the case where neither polymer is utilized. In one specific example, for the constructed samples, 0.27% by weight of SBS and 0.25% by weight of SIS was included within the modified cathode layers. The data marked as "SBS" was from a cathode composite comprising 80 w % active material, 16.73 w % solid electrolyte powder, 3 w % carbon based conductive additive, 2 w % SEBS, and 0.27 w % SBS. The data marked as "PIP" is from a cathode composite comprising 80 w % active material, 16.75 w % solid electrolyte powder, 3 w % carbon based conductive additive, 2 w % SEBS, and 0.25 w % SIS. The data marked as "None" is from a cathode composite comprising 80 w % active material, 17 w % solid electrolyte powder, 3 w % carbon based conductive additive, and 2 w %. In the constructed samples, both SBS and SIS were dissolved in xylene prior to being added to the other constituents of the slurry and adjusting the amount to achieve a greater than 0.6 power law response. For the data shown, the cell was cycled at 70 C between voltages of 2.5 and 4.0 VDC under C/10 conditions.

In some embodiments, a cathode layer of the present disclosure may have an increased active cathode discharge capacity as compared to a cathode layer that does not include a rheology modifying component and that was prepared using methods previously known in the art.

Certain limits may apply to the use of the rheology modifying components described above. Specifically, if the electrolyte used does not contain sulfur that is participating in a chemical bond, then SBS may not have the desired effect. In one embodiment, the SBS may not have a styrene content over 50% or a butadiene content under 50%. In another embodiment, the SBS may not have a styrene content over 30% or a butadiene content under 70%. Without wishing to be bound by theory, lower percentages by weight of the rheology modifying component may allow for the cathode slurry to maintain higher electrical and ionic conductivity resulting in improved cell performance. The use of the rheology modifying component modifies the rheology of the slurry without the need for excess solvents that could react with the electrolyte resulting in lessened cell performance, and that complicate the slurry processing and coating as excess solvent requires removal to adjust the slurry viscosity prior to coating.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples of the present invention, rather than as limiting the scope of the invention. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions.

EXAMPLES

Example 1: Rheology Modification Using SBS with Differing Ratios of Styrene to Rubber An experiment was conducted to determine the effect of differing ratios of styrene to rubber (butadiene) when using SBS as a rheology modifying component on the rheology of the slurry. Two cathode slurries were created to measure this effect, as described below.

The first slurry comprised 80% NMC, 14.75% solid electrolyte material, 2.5% KS6, 0.5% C65, and 2% SEBS. The solids content of the slurry was 77.5%. To the slurry 0.25% of SBS (Kraton D1102, S:R ratio=29:71) was added. The viscosity of the slurry was 1059 cP, and the slurry had a power law coefficient of 0.669.

The second slurry comprised 80% NMC, 14.75% solid electrolyte material, 2.5% KS6, 0.5% C65, and 2% SEBS. The solids content of the slurry was 77.5%. To the slurry 0.25% SBS (Kraton D1155, S:R ratio=40:60) was added. The viscosity of the slurry was 4152 cP, and the slurry had a power law coefficient of 0.422.

The results show that when adding SBS to a cathode slurry with an increased percentage of rubber and a decreased percentage of styrene, the reduction in viscosity increases while the power law coefficient increases. Thus, the impact of SBS's rheology modification increases as the ratio of rubber in the SBS increases.

Example 2: SBS Effect on Percent Solids in Slurry

The effect of SBS on the percent solids required to make a castable slurry was studied. Two separator slurries and two cathode slurries were created to measure the effect on SBS on the percent solids required to form a castable slurry.

A separator slurry was created that included solid electrolyte material and 2% SEBS. The solvent was a mixture of xylenes. In order to make a castable slurry, less than or equal to 45% solids content was required. Next, the same slurry was created with the addition of 0.25% SBS. In order to make a castable slurry, less than or equal to 55% solids content was required.

A cathode slurry was created that included NMC, carbon, and solid electrolyte material, wherein the solvent was a mixture of xylenes. In order to make a castable slurry, less than or equal to 72.5% solids content was required. Next, the same slurry was created with the addition of 0.25% SBS. In order to make a castable slurry, less than or equal to 81% solids content was required.

These results show that the addition of the SBS significantly increased the percent solids required to make a castable slurry.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

As used herein, the terms "a," "an," and "the" are understood to encompass the plural as well as the singular. Thus, the term "a mixture thereof" also relates to "mixtures thereof" and the term "a component" also refers to "components."

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL." The endpoint may also be based on the variability allowed by an appropriate regulatory body, such as the FDA, USP, etc.

In this disclosure, "comprises," "comprising," "containing," and "having" and the like can have the meaning ascribed to them in U.S. Patent Law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. In this specification when using an open-ended term, like "comprising" or "including," it is understood that direct support should be afforded also to "consisting essentially of" language as well as "consisting of" language as if stated explicitly and vice versa.

What is claimed:

1. An electrochemical cell layer comprising:
   a cathode active material;
   a solid-state electrolyte; and
   a rheology modifying component comprising a poly (styrene-butadiene-styrene) block copolymer (SBS),
   wherein the rheology modifying component is present in an amount of less than 0.5% by weight of the electrochemical cell layer, and wherein the SBS has a butadiene content of 50% or more.

2. The electrochemical cell layer of claim 1 wherein the layer is embodied in an electrochemical cell stack, the electrochemical cell stack comprising a separator layer comprising at least one additional binder or polymer.

3. The electrochemical cell layer of claim 2 wherein the binder or polymer is at least one binder or polymer selected from the group consisting of polystyrene, polyvinylidene fluoride (PVdF), and poly (vinylene difluoride-hexafluoropropylene) copolymer (PVdF-HFP).

4. The electrochemical cell layer of claim 1 further comprising a binder or polymer, and a conductive additive.

5. The electrochemical cell layer of claim 1 wherein the cathode active material is selected from the group consisting of NMC, $LiFePO_4$, $LiCoO_2$, NCA, NMA, LMO, and iron sulfide.

6. The electrochemical cell layer of claim 4 wherein the conductive additive is selected from the group consisting of carbon black, graphite, graphene, VGCF, activated carbon, and carbon nanotubes.

7. The electrochemical cell layer of claim 1 wherein the layer is embodied in an electrochemical cell stack, the electrochemical cell stack comprising an anode layer comprising an anode active material, a binder or polymer, and a conductive additive.

8. The electrochemical cell layer of claim 7 wherein the anode active material is selected from the group consisting of Si, Si alloys, graphite, Sn, Li, and lithium alloys.

9. The electrochemical cell layer of claim 7 wherein the conductive additive is selected from the group consisting of carbon black, graphite, graphene, VGCF, activated carbon, and carbon nanotubes.

10. The electrochemical cell layer of claim 1, wherein the rheology modifying component is present in an amount of about 0.25% by weight of the electrochemical cell layer.

* * * * *